United States Patent
Wang et al.

(10) Patent No.: US 9,947,145 B2
(45) Date of Patent: Apr. 17, 2018

(54) SYSTEM AND METHOD FOR PROVIDING INTER-VEHICLE COMMUNICATIONS AMONGST AUTONOMOUS VEHICLES

(71) Applicant: Baidu USA LLC, Sunnyvale, CA (US)

(72) Inventors: Quan Wang, San Jose, CA (US); Biao Ma, San Jose, CA (US); Shaoshan Liu, Sunnyvale, CA (US); James Peng, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 14 days.

(21) Appl. No.: 15/170,697

(22) Filed: Jun. 1, 2016

(65) Prior Publication Data
US 2017/0352200 A1    Dec. 7, 2017

(51) Int. Cl.
*G07C 5/00* (2006.01)
*G08G 1/017* (2006.01)
*G05D 1/02* (2006.01)
*H04W 84/12* (2009.01)

(52) U.S. Cl.
CPC ............. *G07C 5/008* (2013.01); *G05D 1/021* (2013.01); *G08G 1/017* (2013.01); *H04W 84/12* (2013.01)

(58) Field of Classification Search
CPC ........ G07C 5/008; G05D 1/021; G08G 1/017; H04W 84/12
See application file for complete search history.

(56) References Cited

U.S. PATENT DOCUMENTS

| | | | |
|---|---|---|---|
| 2006/0161341 A1* | 7/2006 | Haegebarth | G08G 1/20 701/117 |
| 2014/0302774 A1* | 10/2014 | Burke | H04H 20/57 455/3.05 |
| 2015/0154871 A1* | 6/2015 | Rothoff | G08G 1/22 701/2 |
| 2015/0228195 A1 | 8/2015 | Beaurepaire | |

(Continued)

FOREIGN PATENT DOCUMENTS

| WO | 2015/068501 A1 | 5/2015 |
|---|---|---|
| WO | 2015/075799 A1 | 5/2015 |

OTHER PUBLICATIONS

Wikipedia, k-d tree, Jun. 2013, https://web.archive.org/web/20130623021422/https://en.wikipedia.org/wiki/K-d_tree.*

(Continued)

*Primary Examiner* — Aaron L Troost
(74) *Attorney, Agent, or Firm* — Womble Bond Dickinson (US) LLP

(57) ABSTRACT

In one embodiment, a vehicle identifier (ID) and vehicle information of a first autonomous vehicle is transmitted to a cloud server over a network, where the cloud server is communicatively coupled to a plurality of autonomous vehicles. A list of one or more vehicle identifiers (IDs) are received from the cloud server. The vehicle IDs identify one or more autonomous vehicles are within a predetermined geographic proximity of the first autonomous vehicle. The first autonomous vehicle communicates with a second autonomous vehicle that is selected from the list of one or more autonomous vehicles via a wireless local area network to exchange an operational status of the first autonomous vehicle with the second autonomous vehicle.

26 Claims, 8 Drawing Sheets

(56) References Cited

U.S. PATENT DOCUMENTS

2017/0225682 A1* 8/2017 Schunk .............. B60W 30/165

OTHER PUBLICATIONS

EP Patent Application No. 16201097.7, European Search Report, dated Mar. 3, 2017, 7 pages.
Milanes, V, et al, "Controller for Urban Intersections Based on Wireless Communications and Fuzzy Logic," IEEE Transactions on Intelligent Transportation Systems, vol. 11, No. 1, Mar. 1, 2010, pp. 243-248.

* cited by examiner

| AV ID | Latitude | Longitude | Altitude | Speed | Direction |
|---|---|---|---|---|---|
| AV #1 | | | | | |
| AV #2 | | | | | |
| ... | ... | ... | ... | ... | ... |
| 501 | 502 | 503 | 504 | 505 | 506 |

SYSTEM AND METHOD FOR PROVIDING INTER-VEHICLE COMMUNICATIONS AMONGST AUTONOMOUS VEHICLES

FIELD OF THE INVENTION

Embodiments of the present invention relate generally to autonomous vehicles. More particularly, embodiments of the invention relate to providing inter-vehicle communications amongst autonomous vehicles.

BACKGROUND

Vehicles operating in an autonomous mode (e.g., driverless or self-driving) can relieve occupants, especially the driver, from some driving-related responsibilities. When operating in an autonomous mode, an autonomous vehicle can navigate to various locations using onboard sensors, allowing the vehicle to travel with minimal human interaction or in some cases without any passengers. Other than the objective situations of surrounding environments, autonomous vehicles also need to perceive the subjective intentions of other vehicles nearby in order to make the timely prediction and proper driving decisions. For example, the vehicle on the right lane is trying to change lane and occupy the space in front of an autonomous vehicle, it is probably not a good time for that autonomous vehicle to accelerate and one would expect braking might be needed shortly.

Traditionally, human drivers obtain such information through observing signal lights, mirrors or directly look over his/her shoulders. To exchange information between autonomous vehicles, direct communication through a local network is a more efficient and reliable way. However, it remains a challenging problem to establish and maintain such communication networks especially for autonomous vehicles.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating an example of a data structure storing vehicle information according to one embodiment of the invention.

DETAILED DESCRIPTION

Figure 1:
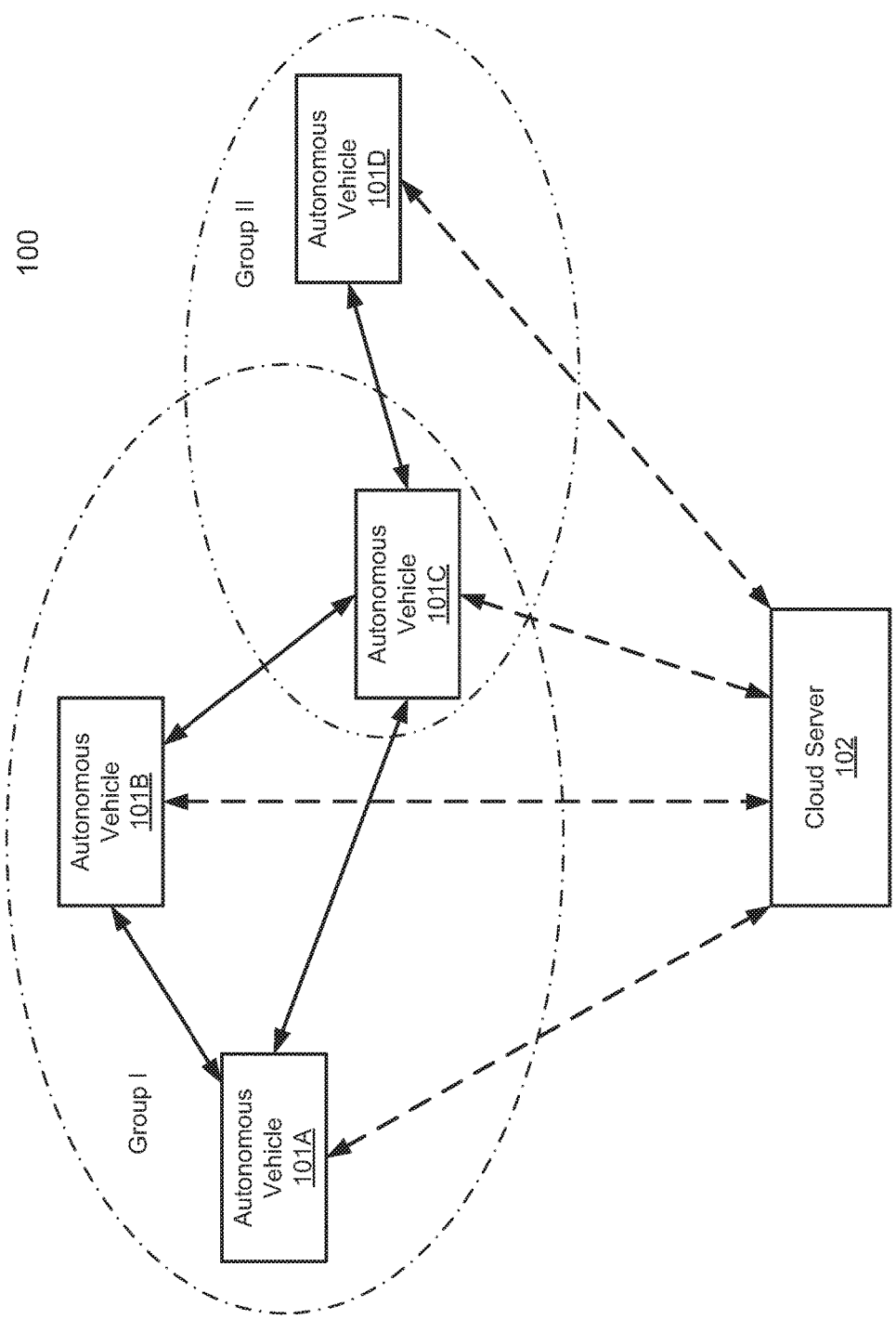
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, some of all of the autonomous vehicles are communicatively coupled to a centralized server (e.g., a cloud server) over a network (e.g., a cloud network). The server periodically receives from the autonomous vehicles certain vehicle information, such as, for example, a geographic location, speed, moving direction, etc. The server maintains a data structure or database storing the vehicle information of the autonomous vehicles that have registered with the server. The data structure, also referred to as a neighboring vehicle data structure is periodically updated in response to the updates received from the autonomous vehicles. The data structure further stores information indicating nearby autonomous vehicles with respect to a particular one of the autonomous vehicles. Such data structure is also referred to as a neighboring or nearby vehicle data structure.

In one embodiment, in response to a request or update received from a vehicle, in addition to updating the neighboring vehicle data structure (e.g., sorting based on vehicle locations, speeds, and moving directions), the server determines a list of one or more autonomous vehicles that are nearby based on the vehicle information stored in the neighboring vehicle data structure. The list of nearby autonomous vehicles is transmitted form the server to the autonomous vehicle to allow the autonomous vehicle communicating with other nearby autonomous vehicles via a local wireless area network, for example, for exchanging operational status of the autonomous vehicles.

According to one aspect of the invention, a first autonomous vehicle transmits a vehicle identifier (ID) and vehicle information of the first autonomous vehicle to a cloud server over a network. The vehicle information may include location information, speed, or moving direction of the first autonomous vehicle. The cloud server is communicatively coupled to a number of autonomous vehicles over the network. The cloud server may maintain a data structure or database to compile and store vehicle information of the autonomous vehicles. Some of the vehicle information may be received from the autonomous vehicle, while other vehicle information may be compiled and generated at the server based on the updated information received from the autonomous vehicles. The first autonomous vehicle receives a list of one or more vehicle IDs identifying one or more autonomous vehicles from the server. The one or more autonomous vehicles are identified by the server that are within a predetermined geographic proximity of the first autonomous vehicle. Based on the vehicle IDs, the first autonomous vehicle communicates with a second autonomous vehicle that is selected from the list over a wireless local area network to exchange an operational status of the first autonomous vehicle with the second autonomous vehicle.

According to another aspect of the invention, a cloud server maintains a neighboring vehicle data structure storing vehicle information or vehicle metadata of a number of autonomous vehicles communicatively coupled to the cloud server over a network (e.g., a cloud network such as the Internet). The server receives a first update request from a first of the autonomous vehicles. The first update request includes a first vehicle identifier (ID) and current vehicle metadata of the first autonomous vehicle. In response to the first update request, the server traverses the neighboring vehicle data structure to update a first node corresponding to the first autonomous vehicle based on the first vehicle ID and the current vehicle information or metadata of the first autonomous vehicle. The server transmits to the first autonomous vehicle over the network a list of one or more vehicle IDs identifying one or more autonomous vehicles that are within a predetermined geographic proximity of the first autonomous vehicles to allow the first autonomous vehicle to directly communicate with any autonomous vehicle in the list via a wireless local area network.

FIG. 1 is a block diagram illustrating a network configuration of autonomous vehicles according to one embodiment of the invention. Referring to FIG. 1, in this example, multiple autonomous vehicles 101A-101D communicatively coupled to centralized server or servers 102 over a network. Although there are only four autonomous vehicles shown in FIG. 1, more or fewer autonomous vehicles may be applicable. Each of autonomous vehicles 101A-101D maintains a connection with server 102, either constantly or periodically dependent upon the specific situation or available signal quality. Each of autonomous vehicles 101A-101D periodically sends certain vehicle information to server 102 to be stored and maintained by server 102 herein. The vehicle information may include location and route information, speed information, and/or moving direction of an autonomous vehicle. The vehicle information may further includes real-time traffic or travel information obtained by the autonomous vehicle, such as, for example, map and point of interest (MPOI) or real-time traffic condition information. Some of these information may be obtained or compiled by server 102.

In response to the updated information received from an autonomous vehicle, server 102 updates a database (e.g., vehicle status/state database or neighboring/nearby vehicle data structure), not shown. In addition, server 102 further analyzes the received vehicle information to determine a list of one or more autonomous vehicles that are within a predetermined proximity of the autonomous vehicle. The vehicle IDs of the autonomous vehicles are then transmitted from server 102 to the requesting autonomous vehicle. The autonomous vehicle can use the nearby vehicle IDs to communicate with other nearby autonomous vehicles. The nearby autonomous vehicles may form a group of autonomous vehicles representing a local area network or community. In this example, based on the vehicle information, autonomous vehicles 101A-101C may be considered as one group, while autonomous vehicles 101C-101D may be considered as another group. With the vehicle IDs of the nearby autonomous vehicles, the autonomous vehicles of the same group can directly communicate with each other to exchange information (e.g., operational status) over a wireless local area network.

Figure 2:
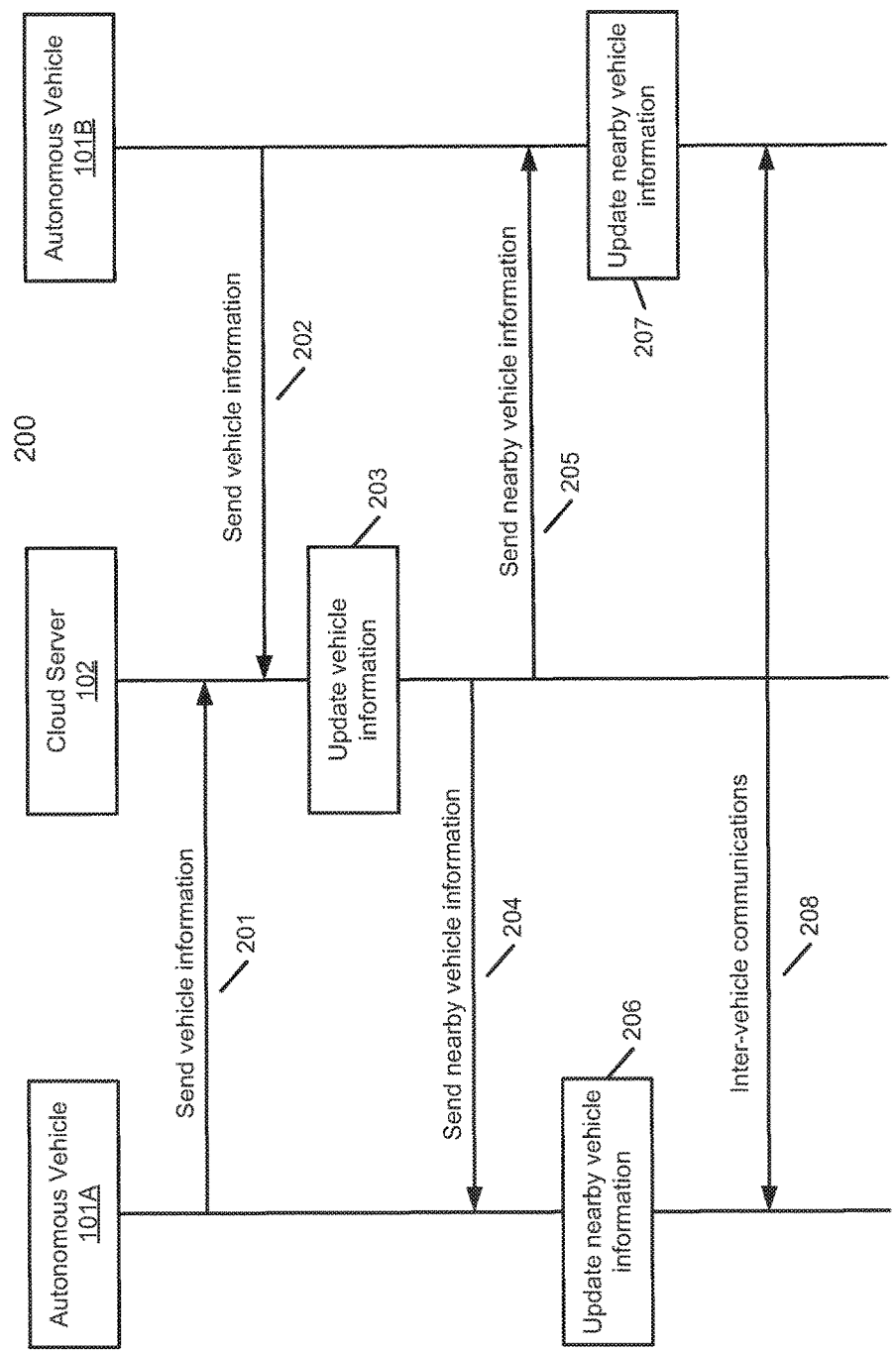
FIG. 2 is a flow diagram illustrating a processing flow of autonomous vehicles according to one embodiment of the invention.

FIG. 2 is a flow diagram illustrating a processing flow of autonomous vehicles according to one embodiment of the invention. Process 200 may be performed by network configuration 100 of FIG. 1. Referring to FIG. 2, autonomous vehicle 101A periodically sends updates of vehicle information to centralized server or servers 102 via path 201. Similarly, autonomous vehicle 101B periodically sends updates of vehicle information to server 102 via path 202. As described above, server 102 may be communicatively coupled to a number of autonomous vehicles, and each of the autonomous vehicles periodically sends updates of their respective vehicle information to server 102. In response to the updates received from the autonomous vehicles, in this example, autonomous vehicles 101A-101B, at block 203, server 102 updates the vehicle information in its database such as a vehicle status or state database. In addition, for each of autonomous vehicles 101A-101B, sever 102 determines a list of nearby autonomous vehicles with respect to the autonomous vehicle, which may be determined based on the vehicle information of the autonomous vehicles.

Server 102 then sends a list of one or more nearby autonomous vehicles with respect to autonomous vehicle 101A to autonomous vehicle 101A via path 204. In this example, the list of nearby autonomous vehicles would include a vehicle ID identifying autonomous vehicle 101B. Server 102 sends a list of one or more nearby autonomous vehicles with respect to autonomous vehicle 101B to autonomous vehicle 101B via path 205. Similarly in this example, the list of nearby autonomous vehicles would include a vehicle ID identifying autonomous vehicle 101A. At blocks 206-207, autonomous vehicles 101A-101B may update the local vehicle information, for example, in a local persistent storage device or local memory. The autonomous vehicles 101A-102B can then communicate with each other using the counterpart vehicle IDs via path 208, for example, for exchanging operational status of autonomous vehicles 101A-101B.

Figure 3:
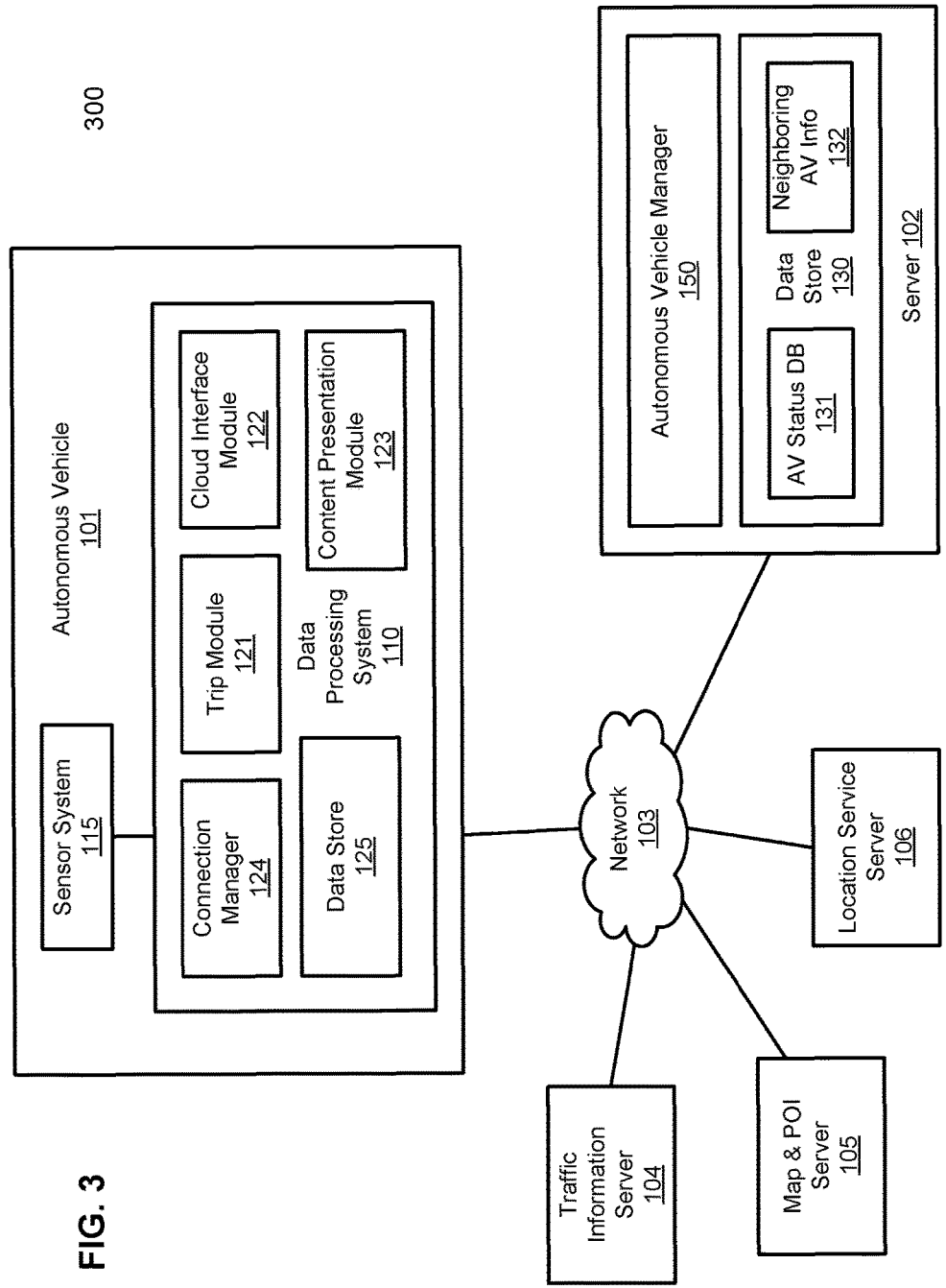
FIG. 3 is a block diagram illustrating a network configuration according to one embodiment of the invention.

FIG. 3 is a block diagram illustrating a network configuration according to one embodiment of the invention. Network configuration 300 may represent at least a portion of network configuration 100 of FIG. 1. Referring to FIG. 3, network configuration 300 includes autonomous vehicle 101 communicatively coupled to a centralized server 102 over a network 103. Although there is one autonomous vehicle shown, multiple autonomous vehicles can be coupled to and managed by server 102 over network 103. For example, autonomous vehicle 101 can represent any of autonomous vehicles 101A-101D as shown in FIG. 1. Network 103 may be any type of networks such as a local area network (LAN), a wide area network (WAN) such as the Internet, a cellular network, a satellite network, or a combination thereof, wired or wireless. Server 102 may be any kind of servers or a cluster of servers, such as Web or cloud servers, application servers, backend servers, or a combination thereof.

In one embodiment, autonomous vehicle 101 includes, but is not limited to, sensor system 115 and data processing system 110. Sensor system 115 includes a variety of sensors or sensing devices that are required in order to enable autonomous vehicle 101 to navigate various roads and places. For example, sensor system 115 may include one or more cameras, a microphone, a global positioning system (GPS), an internal measurement unit (IMU), a radar system, and/or a light detection and range (LIDAR) system. Data processing system 110 is communicatively coupled to sensor system 115, for example, via a bus, an interconnect, or a network. Data processing system 110 is operable to process any data received from sensor system 115, to manage or control sensor system 115, and to communicate with server 102 over network 103. Data processing system 110 may be a dedicated computer equipped with necessary software and hardware to process information received from sensor system 115 and to control and drive autonomous vehicle 101.

In one embodiment, data processing system 110 includes, but is not limited to, trip module 121, cloud interface module 122, content presentation module 123, connection manager 124, and data store 125. Modules 121-124 may be implemented in software, hardware, or a combination thereof. For example, modules 121-124 may be loaded into a system memory and executed by one or more processors of data processing system 110. Trip module 121 manages any data related to a trip of a user riding autonomous vehicle 101. A user may log in and specify a starting location and a destination of a trip, for example, via a user interface. Trip module 121 communicates with other components of autonomous vehicle 101 to obtain the trip related data. For example, trip module 121 may obtain location and route information from location server 106 and map and POI (MPOI) server 105. Location server 106 provides location services and MPOI server 105 provides map services and the POIs of certain locations. During traveling of autonomous vehicle 101 along a route, trip module 121 may also obtain real-time traffic condition or traffic information from traffic information system or server (TIS) 104. Note that servers 104-106 may be operated by a third party entity. Alternatively, the functionalities of servers 104-106 may be integrated with server 102 in which autonomous vehicle 101 can obtain the same information from server 102.

In one embodiment, based on the location and route information, MPOI information, and/or real-time traffic information, content presentation module 123 searches in a content database of data store 125 to identify a list of content items (e.g., a movie, special content or sponsored content such as Ads) that are suitable to be presented for the circumstances at the point in time. The selected content may also be identified based on a user profile of a user riding autonomous vehicle 101. The content items may be ranked according to a predetermined ranking algorithm or ranking models. For example, the content items may be ranked based on user information obtained from a user profile of the user, which may be stored in data store 125. The user information may include user preference, prior behavior, or a history log associated with the user. A content item is then selected based on the rankings. The selected content item is rendered and presented to the user by content representation module 123, for example, displaying on a display device.

Data store 125 may be maintained in a persistent storage device (e.g., a non-volatile storage device such as a hard disk) storing a variety of data including, but is not limited to, a content database, a user profile, trip related information (e.g., location and route information, POIs information). Data stored in data store 125 may be obtained from a variety of data sources, such as, server 102, traffic information server 104, map and POI server 105, and location server 106. For example, content data and user profiles may be provided by and cached from a content database and user profiles stored in data store 130 of server 102 (not shown). Data processing system 110 further includes other components, such as one or more processors (e.g., central processing units or CPUs), a system memory, or a communication interface (e.g., wireless communication interface), etc.

In one embodiment, data processing system 110 further includes connection manager 124 and cloud interface module 122. Cloud interface module 122 is responsible for communicating with autonomous vehicle (AV) manager 150 of cloud server 102. In other words, AV manager 150 is configured to communicate with and manages a number of autonomous vehicles over network 103. Connection manager 124 is configured to communicate with and maintain a connection with other autonomous vehicles nearby.

In one embodiment, trip module 121 obtains current vehicle information of autonomous vehicle 101, for example, by communicating with sensor system 115, servers 104-106. As described above, the vehicle information includes, but is not limited, location and route information, speed, moving direction, or current traffic condition, etc. Cloud interface module 122 receives the vehicle information from trip module 121 and sends an update request to server 102 for updating vehicle information of autonomous vehicle 101 stored in AV status database 131 and/or neighboring AV information 132 stored in data store 130. The request may include a vehicle ID identifying autonomous vehicle 101 and at least a portion of the vehicle information obtained from trip module 121. In response to the update request, AV manager 150 updates the current vehicle information of autonomous vehicle 101 in AV status database 131 and/or neighboring AV information 132.

In addition, AV manager 150 determines one or more autonomous vehicles that are within a predetermined geographic proximity with respect to autonomous vehicle 101 based on neighboring AV information 132, where neighboring AV information 132 may be compiled based on vehicle information of the autonomous vehicles stored in AV status database 131. Note that AV status database 131 and neighboring AV information 132 may be maintained in a single database or single data structure, such as, a k-dimensional (k-d) data structure. AV manager 150 transmits the list of vehicle IDs identifying the nearby autonomous vehicles to autonomous vehicle 101 over network 103, which may be received by cloud interface module 122 and may also be cached or buffered in data store 125 locally. Connection manager 124 of autonomous vehicle 101 can then communicate with any one or more of the nearby autonomous vehicles. Connection manager 124 may maintain such a connection with a nearby autonomous vehicle as long as the nearby autonomous vehicle is within the predetermined geographic proximity, which may be indicated by the neighboring AV information received from server 102.

The neighboring AV information may be transmitted from server 102 in response to each update request from an autonomous vehicle. Alternatively, an autonomous vehicle can specific request for the neighboring AV information at any point of time. For example, when an autonomous vehicle is to make a lane change, the autonomous vehicle can request the neighboring AV information, such that it can communicate with the neighboring AVs that it is about to change lane. In another example, if a user of one autonomous vehicle wants to talk to another user of a nearby autonomous vehicle, the user can initiate the request for neighboring AV information for the purposes of communicating with other users of other autonomous vehicles.

Figure 4:
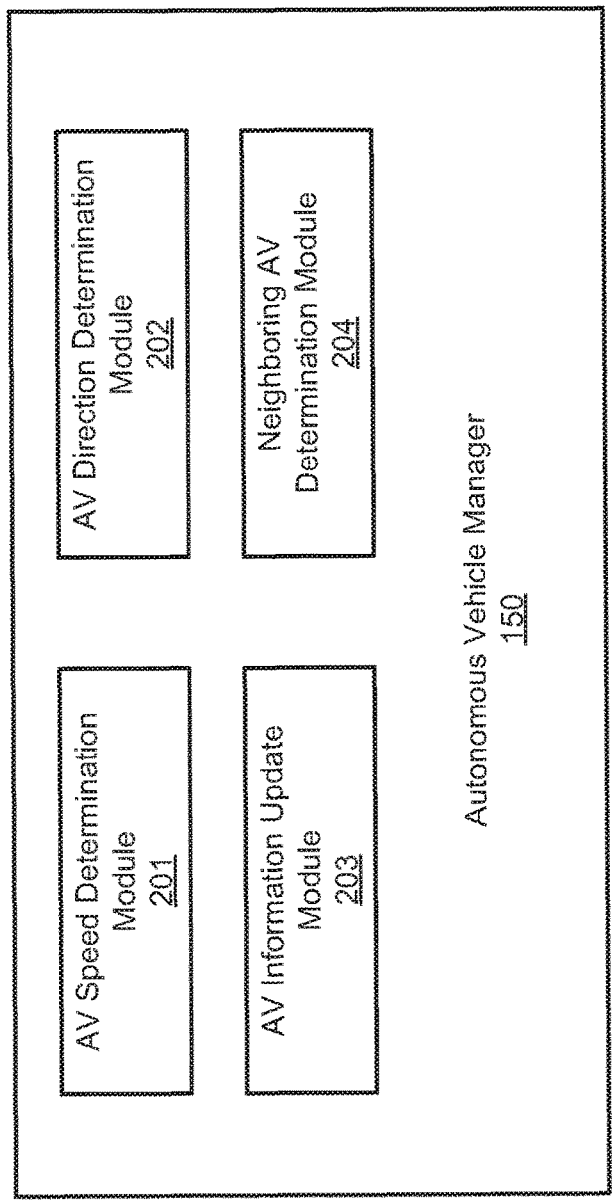
FIG. 4 is a block diagram illustrating an autonomous vehicle manager according to one embodiment of the invention.

FIG. 4 is a block diagram illustrating an autonomous vehicle manager according to one embodiment of the invention. Referring to FIG. 4, AV manager 122 includes, but is not limited to, AV speed determination module 201, AV direction determination module 202, AV information updating module 203, and neighboring AV determination module 204. AV speed determination module is configured to calculate a moving speed of an autonomous vehicle based on the vehicle information (e.g., location information) periodically received from the autonomous vehicle. Similarly, AV direction determination module is to determine a moving direction of the autonomous vehicle based on the vehicle information of the autonomous vehicle. AV speed and direction determination modules 201-202 may be optional, where the speed and moving direction may be received from the autonomous vehicles.

AV information updating module 203 is to update AV status database 131 based on the vehicle information received from the autonomous vehicles. Neighboring AV determination module 204 is to determine one or more neighboring autonomous vehicles with respect to each or a particular autonomous vehicle and to update AV neighboring information 132. In one embodiment, AV neighboring information 132 may be stored in a k-d tree. The k-d tree includes a number of nodes arranged in a hierarchical structure. Each node represents one of the autonomous vehicles communicatively coupled to the server. Each node stores or references vehicle information of the corresponding autonomous vehicle, such as the information as shown in FIG. 5.

A k-d tree is a space-partitioning data structure for organizing points in a k-dimensional space. k-d trees are a useful data structure for several applications, such as searches involving a multidimensional search key (e.g. range searches and nearest neighbor searches). k-d trees are a special case of binary space partitioning trees. The nearest neighbor search (NN) algorithm aims to find the point in the tree that is nearest to a given input point. This search can be done efficiently by using the tree properties to quickly eliminate large portions of the search space.

When an update of vehicle information is received from an autonomous vehicle, AV information updating module 203 performs a search in AV status database 131 and/or neighboring AV information 132 based on a vehicle ID to locate an entry corresponding to the autonomous vehicle, including adding a new entry or node if a new autonomous vehicle connects with the server or removing an existing entry or node if an autonomous vehicle disconnects from the server, etc. Neighboring AV determination module 204 determines a number of autonomous vehicles that are within a predetermined geographic proximity of the requesting autonomous vehicle. For example, neighboring AV determination module 204 performs a nearest neighbor search in neighboring AV information 132 (e.g., k-d tree) to identify the nearby autonomous vehicles. The identified nearby autonomous vehicles are then transmitted back to the requesting autonomous vehicle. The number of the nearby autonomous vehicles may be determined by the server or requested by the requesting autonomous vehicle or a user riding therein. Similarly, the geographic proximity for qualifying nearby autonomous vehicles may be determined by the server or specified by the requesting autonomous vehicles or a user riding therein.

In one embodiment, regardless whether an autonomous vehicle already has existing local communication or need to establish a new one, each autonomous vehicle needs to send its current location information to the cloud servers periodically. Rough location from traditional GPS readings may be good enough, for example, to enable the cloud server to derive or determine the accurate geographic location of the autonomous vehicle based on additional information obtained from other sources, such as a location and route server, a map and point of interest servers, and/or a real-time traffic information server, etc.

Upon receiving a vehicle information update from each autonomous vehicle in the system, most computations, or coordination will be performed at the cloud server. The goal of this operation is for each vehicle to figure out a list of currently 'nearby' vehicles. Here the term 'nearby' is defined in the context of autonomous driving. Besides distance metric, other related factors such as relative positions and moving directions may also be considered as well. For example, the 'nearby' list could contain vehicles at a greater distance in front but at a comparatively shorter distance at back. Moreover, vehicles on the same road but driving towards the opposite direction may be considered as less impact. Those assumptions are similar as how human drivers form their interested observation list on the road.

As for the algorithm itself to compute the list of nearby vehicles among all vehicles in the system, a modified k-d tree containing vehicle specific metadata is utilized. In one embodiment, the dimension k includes at least two for latitude and longitude respectively. Altitude could be included as a third dimension to consider multi-highway intersection or parking structures etc. in metropolitan areas. Additional metadata such as travelling directions are integrated into the tree nodes in order to help to guide or filter during the search process as described above. By using a k-d tree as an efficient indexing data structure, the cloud server can achieve nearest neighbor search in log(n) time as well as the efficient maintenance of the data structure. As a result, a huge number of autonomous vehicles can be recorded in a high dimensional search tree thus avoid the significant process of managing multiple such data structures with data nodes constantly migrating among them.

According to another embodiment, the above list of nearby autonomous vehicles is then returned back from the cloud server(s) to each registered autonomous vehicle. Note that this is a list of vehicles that the cloud servers are unaware of the state of each vehicle's current communication list. In this way the system is decoupled and should be more robust to situations such as loss of connection or components switch over. After receiving from the cloud servers the list of nearby vehicles in the form of network identifications such as IP or domain names, inside each vehicle there are two components handling the list.

One component (e.g., connection manager 124) is to establish a new connection for newly discovered nearby vehicles and to close connections for those are still connected but no longer nearby vehicles (e.g., not present in the latest list received from the cloud servers). Notice those will be direct and highly responsive peer-to-peer connections bypassing cloud layer. Also note that connections may or may not be based upon the global Internet connections. Candidates for the connection type include: a peer-to-peer connection over WiFi, WiFi Direct, and Bluetooth, etc. The other component (e.g., cloud interface module 122) will be syncing topics, services as well as other forms of autonomous driving related APIs for all currently active connections.

FIG. 5 is a block diagram illustrating an example of a data structure storing vehicle information according to one embodiment of the invention. Data structure 500 may represent SV status database 131 and/or neighboring AV information 132 of FIG. 3. Referring FIG. 5, in this example, data structure 500 is shown as a table. However, data structure 500 can be implemented in a variety of forms such as a database. In one embodiment, AV status table 500 includes a number of entries, each entry being identified by a vehicle ID 501. Vehicle ID 501 may be a network address (e.g., Internet protocol or IP address, media access control or MAC address) associated with the vehicle. Each entry corresponds to one of the autonomous vehicles that are currently connected to a server that manages the autonomous vehicles. Each entry is used to store the vehicle information concerning a particular autonomous vehicle, including location information that may be represented by latitude 502, longitude 503, and/or altitude 504. In addition, vehicle information may further include speed 505 and moving direction 506.

Information 502-506 may be received from the autonomous vehicles. Alternatively, some of the information may be determined at the server based on rough location information of an autonomous vehicle. For example, an autonomous vehicle may transmit rough global positioning system (GPS) information concerning the autonomous vehicle to the server. Based on the rough GPS information, the server determines more accurate location information (e.g., latitude 502, longitude 503, and/or altitude 504) by communicating with a location service server. The server may further determine speed 505 and moving direction 506 of an autonomous vehicle, for example, by comparing the current location information with previous location information.

Figure 6:
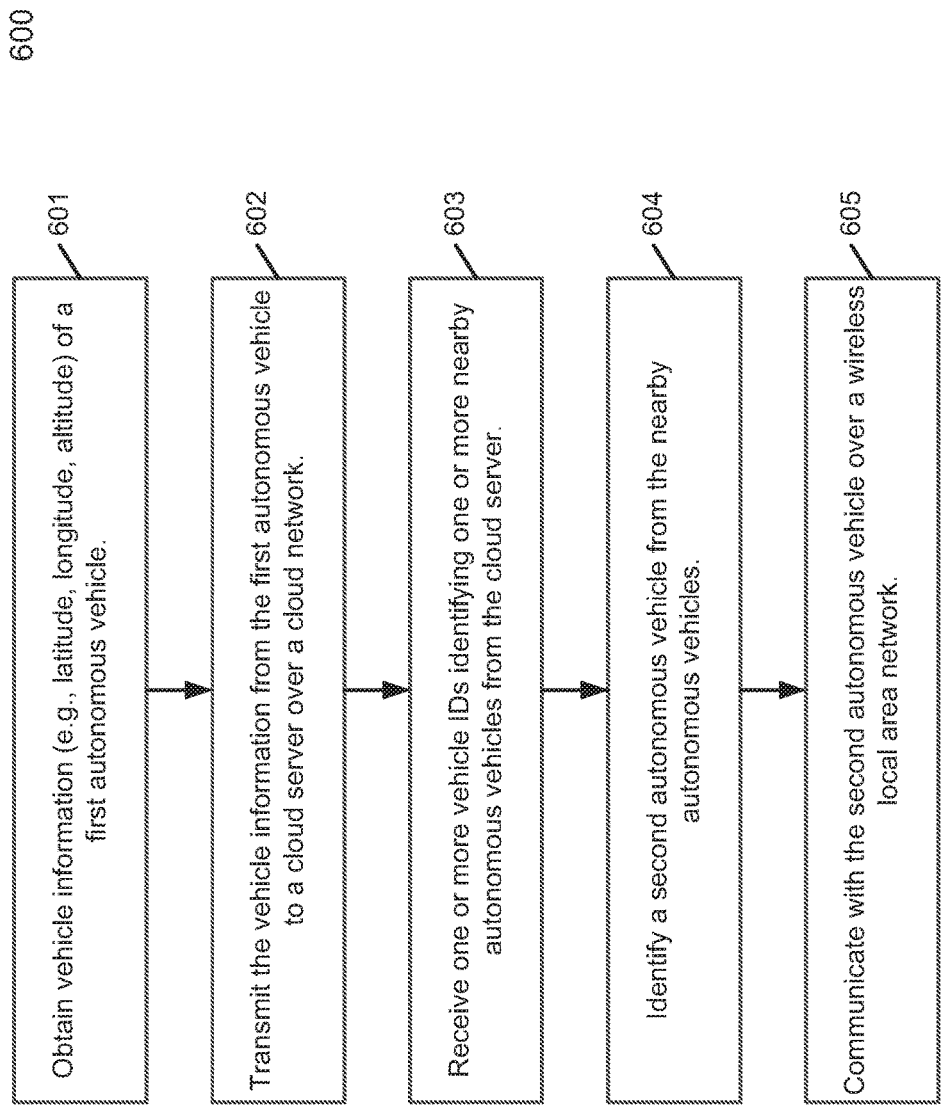
FIG. 6 is a flow diagram illustrating a process of communications amongst autonomous vehicles according to one embodiment of the invention.

FIG. 6 is a flow diagram illustrating a process of communications amongst autonomous vehicles according to one embodiment of the invention. Process 600 may be performed by processing logic which may include software, hardware, or a combination thereof. For example, process 600 may be performed by data processing system 110 of FIG. 1. Referring to FIG. 6, at block 601, processing logic obtains vehicle information such as location information (e.g., latitude, longitude, and/or altitude) of a first autonomous vehicle. The processing logic may obtain such information from its sensor system (e.g., GPS navigation system). At block 602, processing logic transmits the vehicle information, including a vehicle ID of the first autonomous vehicle, to a centralized server (e.g., cloud server) over a network (e.g., cloud network).

At block 603, processing logic receives a list of one or more vehicle IDs identifying one or more autonomous vehicles from the server. The autonomous vehicles in the list are within a predetermined geographic proximity with respect to the first autonomous vehicle. The autonomous vehicles were identified by the server based on the vehicle information provided by the autonomous vehicle, as well as other information obtained from other sources. At block 604, processing logic identifies a second autonomous vehicle from the list (e.g., the autonomous vehicle that may affect operations of the first autonomous vehicle). At block 605, the first autonomous vehicle communicates with the second autonomous vehicle using a vehicle ID (e.g., IP address) of the second autonomous vehicle over a wireless local area network. For example, if the first autonomous vehicle would like to change moving direction into a driving lane of the second autonomous vehicle, the first autonomous vehicle may want to notify the second autonomous vehicle to avoid possible disruption or collision. Alternatively, a user riding on the first autonomous vehicle may want to chat or play a game with a user riding on the second autonomous vehicle.

Figure 7:
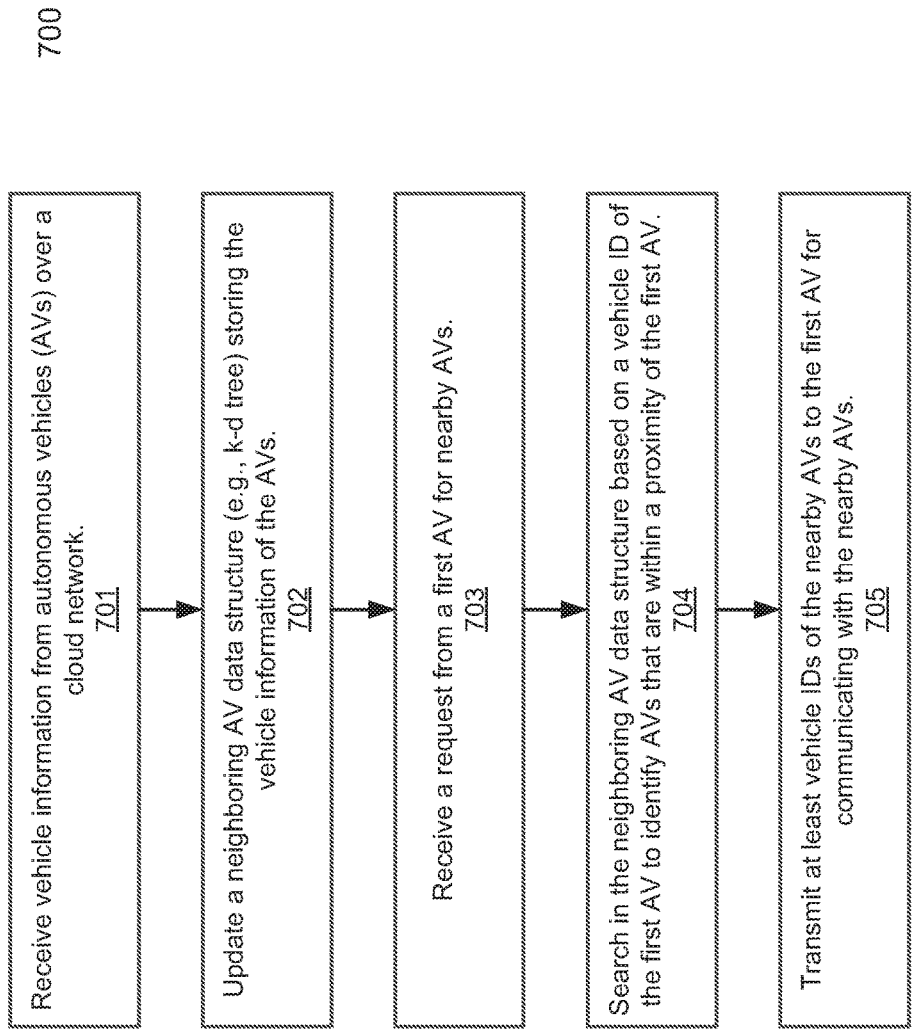
FIG. 7 is a flow diagram illustrating a process of communications amongst autonomous vehicles according to one embodiment of the invention.

FIG. 7 is a flow diagram illustrating a process of communications amongst autonomous vehicles according to one embodiment of the invention. Process 700 may be performed by processing logic which may include software, hardware, or a combination thereof. For example, process 700 may be performed by server 102 of FIG. 1. Referring to FIG. 7, at block 701, processing logic receives vehicle information from a number of autonomous vehicles that communicatively coupled to the server over a network. The vehicle information includes at least location information of the autonomous vehicles, such as latitude, longitude, altitude, speed, or a moving direction of the autonomous vehicles. At block 702, processing logic updates an AV status database and/or a neighboring AV data structure (e.g., k-d tree). The updating operation may further sort the neighboring AV data structure based on the vehicle information that nodes or entries representing the neighboring autonomous vehicles are stored nearby or adjacent to each other.

Subsequently, at block 703, a request is received from a first autonomous vehicle to identify autonomous vehicles that are near the first autonomous vehicle. The request may be a part of an update request of the vehicle information received from the first autonomous vehicle. Alternatively, the request may be specific or separate request received from the first autonomous vehicle, for example, in response to an operation of changing moving direction or a user action of a passenger of the first autonomous vehicle. In response to the request, at block 704, processing logic searches in the neighboring AV information data structure based on a vehicle ID of the first autonomous vehicle to identify one or more autonomous vehicles. The identified autonomous vehicles are currently located within a predetermined geographic proximity with respect to the first autonomous vehicle. For example, processing logic may invoke a neighborhood search algorithm in a k-d tree representing the neighboring AV information data structure to identify the nearby autonomous vehicles. At block 705, processing logic transmits a list of vehicle IDs (e.g., IP addresses) identifying the nearby autonomous vehicles to the first autonomous vehicle to allow the first autonomous vehicle to communicate with any of the nearby autonomous vehicles.

An autonomous vehicle described above refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller use the detected information to navigate through the environment. The sensor system may include one or more cameras, a microphone, a global positioning system (GPS), an internal measurement unit (IMU), a radar system, and/or a light detection and range (LIDAR) system.

A GPS system may estimate a geographic location of the autonomous vehicle. The GPS system may include a transceiver operable to provide information regarding the position of the autonomous vehicle. An IMU unit may sense position and orientation changes of the autonomous vehicle based on inertial acceleration. A radar unit may represent a system that utilizes radio signals to sense objects within the local environment of the autonomous vehicle. In some embodiments, in addition to sensing objects, the radar unit may additionally sense the speed and/or heading of the objects. A LIDAR unit may sense objects in the environment in which the autonomous vehicle is located using lasers. The LIDAR unit could include one or more laser sources, a laser scanner, and one or more detectors, among other system components. A camera may include one or more devices capture images of the environment surrounding the autonomous vehicle. The camera may be a still camera or a video camera. A camera may be mechanically movable such as by rotating and/or tilting a platform to which the camera is mounted. A microphone may be configured to capture sound from the environment surrounding the autonomous vehicle.

An autonomous vehicle may further include a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, estimate the speed of objects, etc.

An autonomous vehicle may further include a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. The navigation system may update the driving path dynamically while the autonomous vehicle is in operation. The navigation system can incorporate data from a GPS system and one or more maps so as to determine the driving path for the autonomous vehicle.

An autonomous vehicle may further include a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in a control system to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

An autonomous vehicle may further include a wireless communication system to allow communication between the autonomous vehicle and external systems, such as devices, sensors, other vehicles, etc. within its surrounding environment and/or controllers, servers, etc., which can provide useful information regarding the vehicle's surroundings, such as traffic information, weather information, etc. For example, the wireless communication system can wirelessly communicate with one or more devices directly or via a communication network. The wireless communication system can use any cellular communication network or a wireless local area network (WLAN), e.g., using WiFi. The wireless communication system could communicate directly with a device, for example, using an infrared link, Bluetooth, etc.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
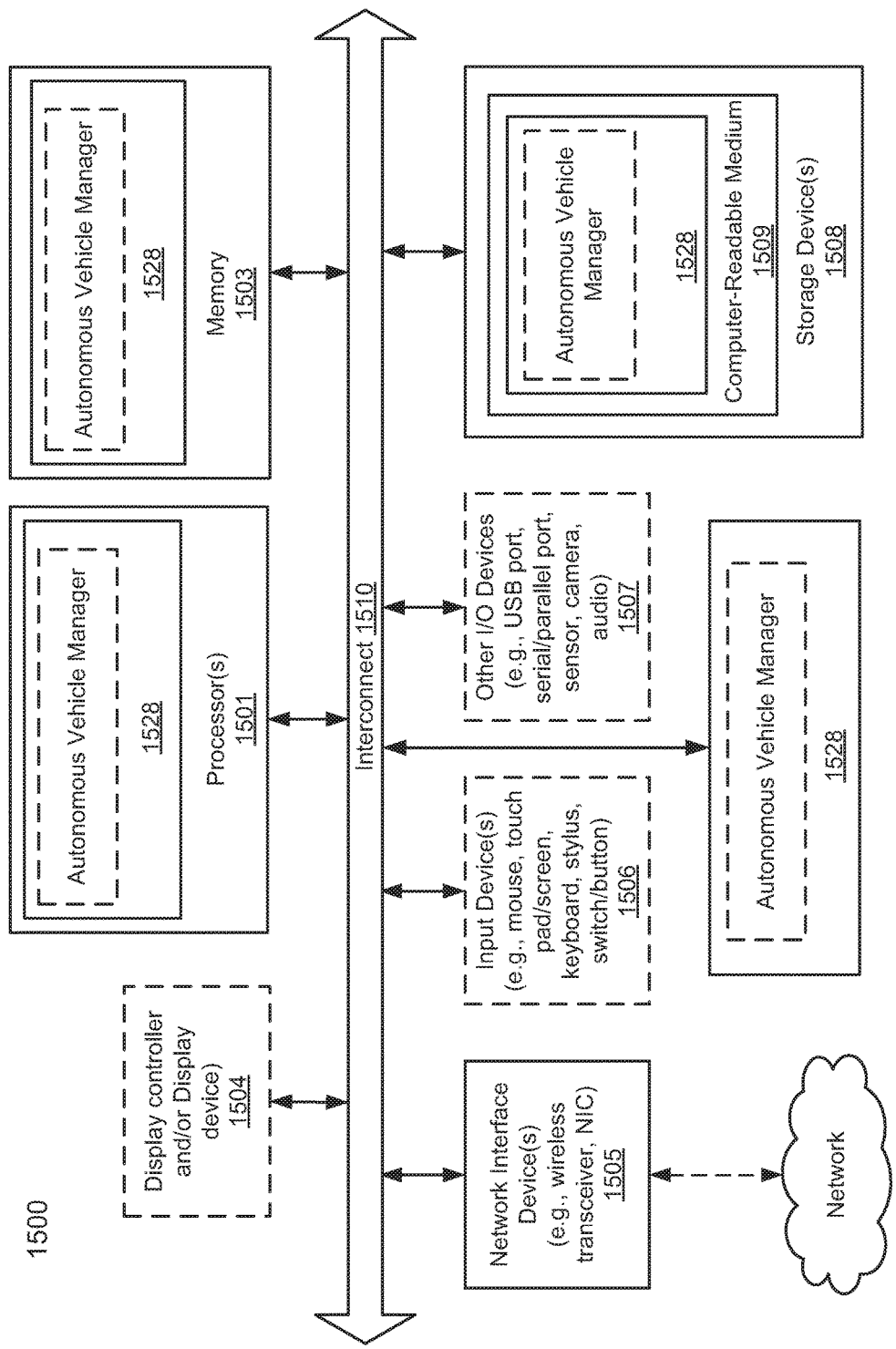
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above, such as, for example, data processing system 110 or server 102 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for inter-vehicle communications amongst autonomous vehicles, the method comprising:
    transmitting a vehicle identifier (ID) and vehicle information of a first autonomous vehicle in transit to a cloud server over a network, wherein the cloud server is communicatively coupled to a plurality of autonomous vehicles;
    receiving a list of one or more vehicle identifiers (IDs) from the cloud server, the vehicle IDs identifying one or more autonomous vehicles are within a predetermined geographic proximity of the first autonomous vehicle, wherein the one or more autonomous vehicles are identified by the cloud server using a nearest neighbor search algorithm; and
    directly communicating with a second autonomous vehicle in transit that is selected from the list of one or more autonomous vehicles via a wireless local area network to exchange an operational status of the first autonomous vehicle with the second autonomous vehicle.

2. The method of claim 1, wherein the autonomous vehicles of the list were identified by the cloud server based on location information of the first autonomous vehicle and location information of the one or more autonomous vehicles.

3. The method of claim 2, wherein the cloud server maintains a neighboring vehicle data structure storing geographic neighboring information of the plurality of autonomous vehicles based on their respective vehicle information periodically received from the plurality of autonomous vehicles.

4. The method of claim 3, wherein the neighboring vehicle data structure comprises a k-dimensional (k-d) tree, wherein the k-d tree comprises a plurality of nodes in a hierarchical structure, each node corresponding to one of the plurality of autonomous vehicles managed by the cloud server.

5. The method of claim 1, wherein each vehicle ID of the list includes an Internet protocol (IP) address and a domain associated with a corresponding autonomous vehicle for communications over the wireless local area network.

6. The method of claim 1, wherein the operational status includes an indicator indicating that the first autonomous vehicle is about to change from a first lane currently occupied by the first autonomous vehicle to a second lane currently occupied by the second autonomous vehicle.

7. The method of claim 1, wherein the second autonomous vehicle periodically updates its vehicle information with the cloud server, and wherein the second autonomous vehicle receives a second list of one or more nearby autonomous vehicles from the cloud server, including the first autonomous vehicle.

8. A non-transitory machine-readable medium having instructions stored therein, which when executed by a processor, cause the processor to perform operations of inter-vehicle communications, the operations comprising:
    transmitting a vehicle identifier (ID) and vehicle information of a first autonomous vehicle in transit to a cloud server over a network, wherein the cloud server is communicatively coupled to a plurality of autonomous vehicles;
    receiving a list of one or more vehicle identifiers (IDs) from the cloud server, the vehicle IDs identifying one or more autonomous vehicles are within a predetermined geographic proximity of the first autonomous vehicle, wherein the one or more autonomous vehicles are identified by the cloud server using a nearest neighbor search algorithm; and
    directly communicating with a second autonomous vehicle in transit that is selected from the list of one or more autonomous vehicles via a wireless local area network to exchange an operational status of the first autonomous vehicle with the second autonomous vehicle.

9. The non-transitory machine-readable medium of claim 8, wherein the autonomous vehicles of the list were identified by the cloud server based on vehicle information of the first autonomous vehicle and vehicle information of the one or more autonomous vehicles.

10. The non-transitory machine-readable medium of claim 9, wherein the cloud server maintains a neighboring vehicle data structure storing geographic neighboring information of the plurality of autonomous vehicles based on their respective vehicle information periodically received from the plurality of autonomous vehicles.

11. The non-transitory machine-readable medium of claim 10, wherein the neighboring vehicle data structure comprises a k-dimensional (k-d) tree, wherein the k-d tree comprises a plurality of nodes in a hierarchical structure, each node corresponding to one of the plurality of autonomous vehicles managed by the cloud server.

12. The non-transitory machine-readable medium of claim 8, wherein each vehicle ID of the list includes an Internet protocol (IP) address and a domain associated with a corresponding autonomous vehicle for communications over the wireless local area network.

13. The non-transitory machine-readable medium of claim 8, wherein the operational status includes an indicator indicating that the first autonomous vehicle is about to change from a first lane currently occupied by the first autonomous vehicle to a second lane currently occupied by the second autonomous vehicle.

14. The non-transitory machine-readable medium of claim 8, wherein the second autonomous vehicle periodically updates its vehicle information with the cloud server, and wherein the second autonomous vehicle receives a second list of one or more nearby autonomous vehicles from the cloud server, including the first autonomous vehicle.

15. A data processing system operating within an autonomous vehicle, comprising:
   a processor; and
   a memory coupled to the processor to store instructions, which when executed by the processor, cause the processor to perform operations, the operations including
      transmitting a vehicle identifier (ID) and vehicle information of a first autonomous vehicle in transit to a cloud server over a network, wherein the cloud server is communicatively coupled to a plurality of autonomous vehicles,
      receiving a list of one or more vehicle identifiers (IDs) from the cloud server, the vehicle IDs identifying one or more autonomous vehicles are within a predetermined geographic proximity of the first autonomous vehicle, wherein the one or more autonomous vehicles are identified by the cloud server using a nearest neighbor search algorithm, and
      directly communicating with a second autonomous vehicle in transit that is selected from the list of one or more autonomous vehicles via a wireless local area network to exchange an operational status of the first autonomous vehicle with the second autonomous vehicle.

16. The system of claim 15, wherein the autonomous vehicles of the list were identified by the cloud server based on vehicle information of the first autonomous vehicle and vehicle information of the one or more autonomous vehicles.

17. The system of claim 16, wherein the cloud server maintains a neighboring vehicle data structure storing geographic neighboring information of the plurality of autonomous vehicles based on their respective vehicle information periodically received from the plurality of autonomous vehicles.

18. The system of claim 17, wherein the neighboring vehicle data structure comprises a k-dimensional (k-d) tree, wherein the k-d tree comprises a plurality of nodes in a hierarchical structure, each node corresponding to one of the plurality of autonomous vehicles managed by the cloud server.

19. The system of claim 15, wherein each vehicle ID of the list includes an Internet protocol (IP) address and a domain associated with a corresponding autonomous vehicle for communications over the wireless local area network.

20. The system of claim 15, wherein the operational status includes an indicator indicating that the first autonomous vehicle is about to change from a first lane currently occupied by the first autonomous vehicle to a second lane currently occupied by the second autonomous vehicle.

21. The system of claim 15, wherein the second autonomous vehicle periodically updates its vehicle information with the cloud server, and wherein the second autonomous vehicle receives a second list of one or more nearby autonomous vehicles from the cloud server, including the first autonomous vehicle.

22. A computer-implemented method for managing statuses of autonomous vehicles, the method comprising:
   maintaining at a cloud server a neighboring vehicle data structure storing vehicle metadata of a plurality of autonomous vehicles communicatively coupled to the cloud server over a network;
   receiving a first update request from a first of the autonomous vehicles in transit, the first update request including a first vehicle identifier (ID) and current vehicle metadata of the first autonomous vehicle;
   in response to the first update request, traversing the neighboring vehicle data structure to update a first node corresponding to the first autonomous vehicle based on the first vehicle ID and the current vehicle metadata of the first autonomous vehicle;
   identifying one or more autonomous vehicles that are within a predetermined geographic proximity of the first autonomous vehicle using a neighbor search algorithm; and
   transmitting to the first autonomous vehicle in transit over the network a list of one or more vehicle IDs identifying the one or more autonomous vehicles that are within the predetermined geographic proximity of the first autonomous vehicle to allow the first autonomous vehicle to directly communicate with any autonomous vehicle in the list via a wireless local area network.

23. The method of claim 22, wherein the neighboring vehicle data structure includes a plurality of nodes arranged in a hierarchical structure, and wherein each node corresponds to one of the plurality of autonomous vehicles to store vehicle metadata of a corresponding autonomous vehicle.

24. The method of claim 22, wherein the neighboring vehicle data structure comprises a k-dimensional (k-d) tree.

25. The method of claim 23, wherein the vehicle metadata of an autonomous vehicle includes at least one of a current location, a speed, and a moving direction of the autonomous vehicle.

26. The method of claim 22, wherein a vehicle ID includes an Internet protocol (IP) address of a corresponding autonomous vehicle.

* * * * *